US 6,949,849 B1

(12) United States Patent
Wright et al.

(10) Patent No.: US 6,949,849 B1
(45) Date of Patent: Sep. 27, 2005

(54) MOTOR ENDSHIELD ASSEMBLY FOR AN ELECTRONICALLY COMMUTATED MOTOR

(75) Inventors: Kamron M. Wright, Fort Wayne, IN (US); Peter B. Lytle, Fort Wayne, IN (US); Andrew N. Young, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/806,604

(22) PCT Filed: Jun. 29, 1999

(86) PCT No.: PCT/US99/14753

§ 371 (c)(1),
(2), (4) Date: Aug. 3, 2001

(87) PCT Pub. No.: WO00/01054

PCT Pub. Date: Jan. 6, 2000

Related U.S. Application Data

(60) Provisional application No. 60/091,257, filed on Jun. 30, 1998.

(51) Int. Cl.⁷ ............................................. H02K 5/00
(52) U.S. Cl. ........................ 310/89; 310/64; 310/68 R
(58) Field of Search ...................... 310/89, 84, DIG. 6, 310/85, 68 R, 64, 71, 91, 58; 29/596

(56) References Cited

U.S. PATENT DOCUMENTS

| | | | | |
|---|---|---|---|---|
| 575,096 A | * | 1/1897 | Batchelder | .................... 493/75 |
| 972,929 A | * | 10/1910 | Search | ......................... 310/64 |
| 4,266,152 A | * | 5/1981 | Herr et al. | ...................... 310/59 |
| 4,284,914 A | | 8/1981 | Hagenlocher et al. | |
| 4,321,664 A | | 3/1982 | Matthai | |
| 4,341,966 A | | 7/1982 | Pangburn | |
| 4,538,169 A | | 8/1985 | Smith et al. | |
| 4,606,000 A | | 8/1986 | Steele et al. | |
| 4,631,433 A | | 12/1986 | Stokes | |
| 4,668,898 A | * | 5/1987 | Harms et al. | ................ 318/254 |
| 4,773,829 A | * | 9/1988 | Vettori | ........................ 417/366 |
| 4,799,309 A | | 1/1989 | Cinzori et al. | |
| 4,840,222 A | | 6/1989 | Lakin et al. | |
| 4,952,829 A | | 8/1990 | Armbruster et al. | |
| 5,006,744 A | * | 4/1991 | Archer et al. | .................. 310/89 |
| 5,043,614 A | * | 8/1991 | Yockey | ..................... 310/68 D |
| 5,296,778 A | * | 3/1994 | Stroud | ....................... 310/68 D |
| 5,331,231 A | | 7/1994 | Koplin et al. | |
| 5,383,092 A | * | 1/1995 | Liberati | ...................... 361/704 |
| 5,451,823 A | * | 9/1995 | Deverall et al. | ........... 310/68 D |
| 5,585,682 A | | 12/1996 | Konicek et al. | |
| 5,640,062 A | * | 6/1997 | Yockey | ..................... 310/68 D |
| 5,646,838 A | * | 7/1997 | Keidar et al. | ................ 363/145 |
| 5,682,070 A | * | 10/1997 | Adachi et al. | .................. 310/71 |
| 5,712,517 A | * | 1/1998 | Schmidt et al. | ................ 310/45 |
| 5,714,816 A | | 2/1998 | Jensen et al. | |

(Continued)

FOREIGN PATENT DOCUMENTS

JP 03128641 A * 5/1991 ............ H02K/11/00

*Primary Examiner*—Burton S. Mullins
*Assistant Examiner*—Heba Elkassabgi
(74) *Attorney, Agent, or Firm*—Armstrong Teasdale LLP

(57) ABSTRACT

An endshield assembly for an electronically commutated motor includes an endshield, a control assembly, and a power assembly. The endshield includes a plurality of recessed fins on an outer surface, and a substantially flat raised portion on an internal surface. The raised portion is in contact with a thermal pad. The control assembly includes the thermal pad and a control board on which is located a plurality of power transistors. The thermal pad provides thermal contact between the transistors and the endshield to enable the endshield to dissipate heat from the transistors. The transistors include a plurality of leads that extend substantially parallel to the control board which enable the leads to be coated for protection against harsh external environments. The power assembly includes a power board having an insulator positioned between the power board and the control board.

24 Claims, 3 Drawing Sheets

U.S. PATENT DOCUMENTS

| | | | | |
|---|---|---|---|---|
| 5,723,936 A | | 3/1998 | Wagner | |
| 5,757,096 A | * | 5/1998 | DuBois et al. | 310/68 D |
| 6,031,306 A | * | 2/2000 | Permuy | 310/67 R |
| 6,081,056 A | * | 6/2000 | Takagi et al. | 310/89 |
| 6,291,912 B1 | * | 9/2001 | Nadir et al. | 310/64 |
| 6,577,030 B2 | * | 6/2003 | Tominaga et al. | 310/68 B |
| 2002/0079762 A1 | * | 6/2002 | Fukuda et al. | 310/81 |
| 2003/0071529 A1 | * | 4/2003 | Rahbar et al. | 310/89 |

* cited by examiner

MOTOR ENDSHIELD ASSEMBLY FOR AN ELECTRONICALLY COMMUTATED MOTOR

This application is a 371 of PCT US99/14753 filed Jun. 29, 1999, which is a continuation of U.S. provisional Ser. No. 60/091,257 filed Jun. 30, 1998.

BACKGROUND OF THE INVENTION

This invention relates generally to electric motors and more particularly, to an endshield assembly for an electric motor.

Known electronically commutated motors have a multi-stage winding assembly and a magnetic assembly associated for relative rotation. The winding stages of the multi-stage winding assembly have a preset energization sequence that includes at least one unenergized winding stage in which an induced back EMF appears. When integrated over time to a predetermined value, the induced back EMF indicates the instant at which the relative angular position between the multi-stage winding assembly and the magnetic assembly is suitable for the sequential commutation of the next winding stage.

The electronic circuitry for an electronically commutated motor generally includes a power circuit, a regulating circuit, and a control circuit. The power circuit has solid state switching devices for commutating the power supplied to the electronically commutated motor to effect its energization. The regulating circuit has various solid state components for maintaining the power supplied to the electronically commutated motor generally constant. The control circuit has various solid state components for controlling the conductivity of the switching devices.

Some of the solid state components for an electronically commutated motor, e.g., transistors, need to be relatively large to accommodate the currents that must pass trough them. Large transistors can produce a sizable amount of heat that should be dissipated from the transistors in order to keep them functioning properly. It is well known in the art that to promote heat dissipation, the electronic circuitry for an electronically commutated motor can be positioned adjacent an outer surface of an endshield of the motor. However, this increases costs since another compartment is needed to protect the electronic circuitry.

Accordingly, it would be desirable to provide a mounting arrangement for the electronic components of an electronically commutated motor that provides good heat dissipation without significantly increasing the cost of the motor. Additionally, it would be desirable to eliminate the additional compartment needed to protect the electronic circuitry.

BRIEF SUMMARY OF THE INVENTION

Electronically commutated motors are well known, such as the motor described in U.S. Pat. No. 5,006,744, which patent is assigned to the present assigned and hereby incorporated herein, in its entirety, by reference.

In an exemplary embodiment of the invention, a motor endshield assembly for an electronically commutated motor includes an endshield having an inner surface and an outer surface, with the outer surface including a plurality of recessed fins. The endshield assembly according to one embodiment of the present invention includes a control assembly and a power assembly mounted thereto. The control assembly includes a control board having a plurality of power transistors. The internal surface of the endshield includes a substantially flat raised area that is in contact with the control assembly and serves as a heatsink for the power transistors. The transistors are in contact with a thermal pad located between the transistors and the endshield. The thermal pad electrically insulates the transistors yet still conducts heat from the transistors to the endshield. The recessed fins are located directly above the substantially flat raised portion on the endshield and assist the dissipation of heat from the transistors and endshield to the ambient environment.

The power assembly includes a power board having an insulator positioned between the power board and the control board. A first spacer extends between the control board and the power board to provide the proper spacing therebetween. A plurality of clamp bars are also positioned between the power board and the transistors. The clamp bars apply pressure to the transistors and keep the transistors in contact with the substantially flat raised portion of the endshield. The first spacer and the clamp bars extend through the insulator. A second spacer extends between the control board and the endshield to provide the proper spacing therebetween.

In one embodiment, each power transistor includes a plurality of leads that extend substantially parallel to the control board. The leads exit a front side of the transistor at a position that is closer to a bottom of the transistor than to a top. The bottom of the transistor is in contact with the control board while the top of the transistor includes a tab that extends from a back side of the transistor parallel to the control board.

With the above described endshield assembly, only one compartment is required since the electronic controls are located within the motor housing. In addition, use of the endshield as a low impedance path to dissipate heat from the power devices of the internal electronic circuitry to the ambient environment provides good thermal performance for the motor. Also, since the transistor leads are parallel to and away from the control board, the lengths of the leads are much closer to the surface of the board than in many known control assemblies. The leads are thus easy to encapsulate and protect from harsh external environments.

DETAILED DESCRIPTION OF THE INVENTION

Figure 1:
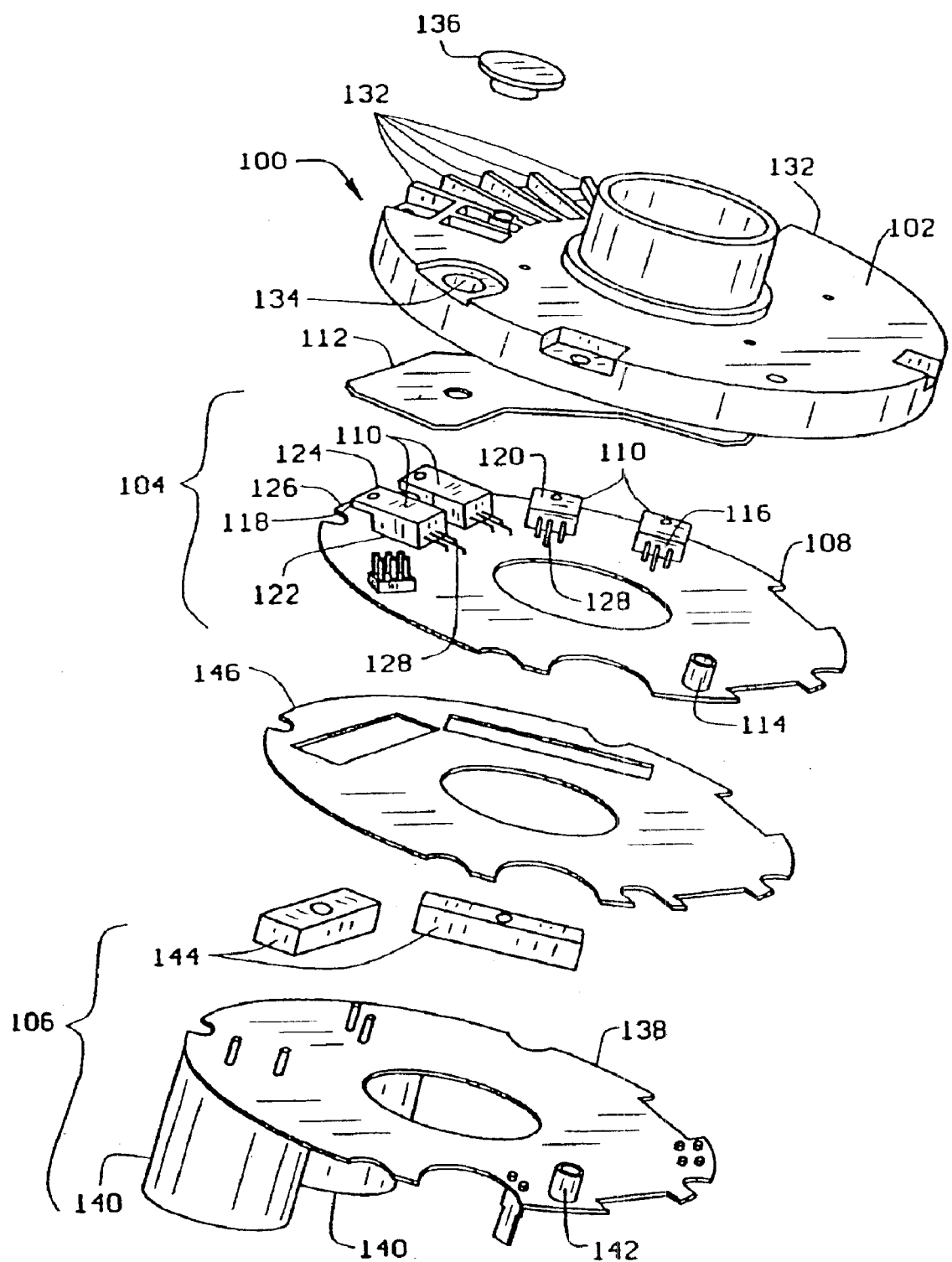
FIG. 1 is an exploded view of an endshield assembly in accordance with one embodiment of the present invention.

FIG. 1 is an exploded view of an endshield assembly 100 for an electronically commutated motor (not shown). Endshield assembly 100 includes an endshield 102, a control assembly 104, and a power assembly 106. Control assembly 104 includes a control board 108, a plurality of transistors 110, a thermal pad 112, and a spacer 114. In one embodiment, spacer 114 is fabricated from nylon and extends between control board 108 and endshield 102. Spacer 114 helps to maintain a predetermined separation distance between control board 108 and endshield 102.

Transistors 110 include a front 116, back 118, top 120, bottom 122, and a tab 124. Tab 124 extends from back 118 of transistors 110 and has a surface 126 that is an extension of, and is substantially parallel to, top 120. A plurality of leads 128 extend from front 116 of transistor 110. In one embodiment, leads 128 extend substantially parallel to control board 108 and maintain a substantially constant separation distance between themselves and control board 108. Since leads 128 extend from front 116 in a location that is closer to control board 108 than to top 120, leads 128 remain relatively close to control board 108 throughout their length. Only a small separation distance exists between leads 128 and control board 108. The small separation distance allows conformal coating to easily encapsulate leads 128 which helps to protect them from damage in harsh environments. The encapsulation of leads 128 facilitates reducing failures caused by moisture in the area of high potential. To insert leads 128 into control board 108, leads 128 must be formed at right angles to transistor 110.

Transistors 110 are capable of producing significant heat depending on the amount of current that flows through them. The heat should be dissipated from the transistors and the surrounding motor in order to ensure proper operation of the motor. In one embodiment, top 120 of each transistor 110 is in thermal contact with thermal pad 112. Thermal pad 112 electrically isolates transistors 110 and conducts the heat generated by transistors 110 away from transistors 110. Thermal pad 112 contacts endshield 102 which includes an inner surface (not shown) and an outer surface 130 that has a plurality of recessed fins 132. In one embodiment, endshield 102 is fabricated from cast aluminum and serves a heatsink for transistors 110. The inner surface of endshield 102 includes a substantially flat raised portion (not shown). The substantially flat raised portion is in thermal contact with thermal pad 112 and is located directly beneath recessed fins 132. In one embodiment, recessed fins 132 extend from the substantially flat raised portion. The heat from transistors 110 travels through thermal pad 112 to endshield 102 and is dissipated from recessed fins 132 to the ambient environment. Endshield 102 serves as a heat sink to transistors 110 and helps to dissipate heat from transistors 110 to the ambient environment. This heat dissipation helps reduce stress on transistors 110. Endshield 102 further includes a cap plug opening 134 and a cap plug 136 as will be discussed in more detail below.

Power assembly 106 includes a power board 138, electronic components 140, a spacer 142, a plurality of clamp bars 144, and an insulator 146. Insulator 146 is positioned between control board 108 and power board 138 and electrically insulates portions of control board 108 from portions of power board 138. Spacer 142 and clamp bars 144 extend between control board 108 and power board 138. Spacer 142 and clamp bars 144 facilitate maintaining a predetermined distance between power board 142 and control board 108. Spacer 142 and clamp bars 144 extend through insulator 146 and are in contact with both control board 108 and power board 138. In one embodiment, spacer 142 is fabricated from nylon.

Clamp bars 144 are positioned on an opposite side of power board 138 from electronic components 140 and are located between electronic components 140 and transistors 110. Clamp bars 144 apply pressure on transistors 110 to ensure a good thermal interface between transistors 110 and endshield 102.

Figure 2:
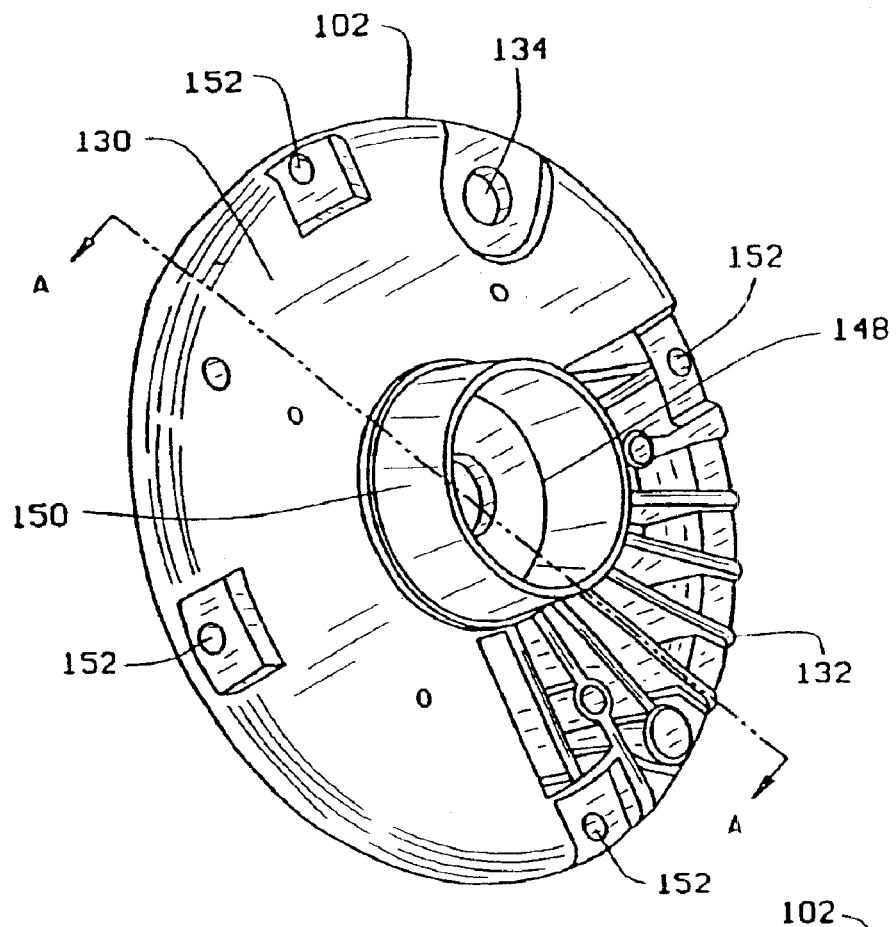
FIG. 2 is a perspective view of the endshield shown in FIG. 1.

FIG. 2 is a perspective view of endshield 102. Endshield 102 includes a shaft opening 148 for a rotor bearing (not shown). In one embodiment, outer surface 130 of endshield 102 includes a raised cylinder 150 that projects from endshield 102 and surrounds opening 148. Raised cylinder 150 includes a resilient ring (not shown) mounted therein. Endshield 102 further includes a plurality of bolt openings 152. Bolt openings 152 extend through endshield 102 and through bolts (not shown) are inserted therethrough to mount endshield 102 to the shell of an electronically commutated motor (not shown). Cap plug opening 134, as explained above, extends through endshield 102 and allows access to internal components (not shown) during final testing and calibration. Cap plug opening 134 permits access to the internal components without having to remove endshield 102. Cap plug 136 (not shown in FIG. 2) covers cap plug opening 134 to protect the internal components.

Figure 3:
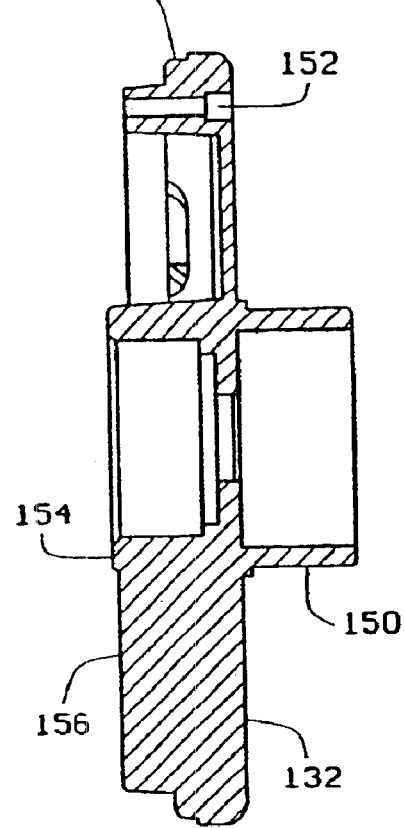
FIG. 3 is a cross section of the endshield shown in FIG. 2 along A—A.

FIG. 3 is a cross-section view of endshield 102 and illustrates an inner surface 154 that includes a substantially flat raised portion 156. Raised portion 156 is located directly beneath recessed fins 132 and is a component of a thermal pathway between transistors 110 (not shown in FIG. 3) and recessed fins 132. Recessed fins 132 extend from raised portion 156 to increase the surface area of outer surface 130 which facilitates the dissipation of heat from endshield 102. Raised cylinder 150 and bold opening 152 are also illustrated in FIG. 3.

Figure 4:
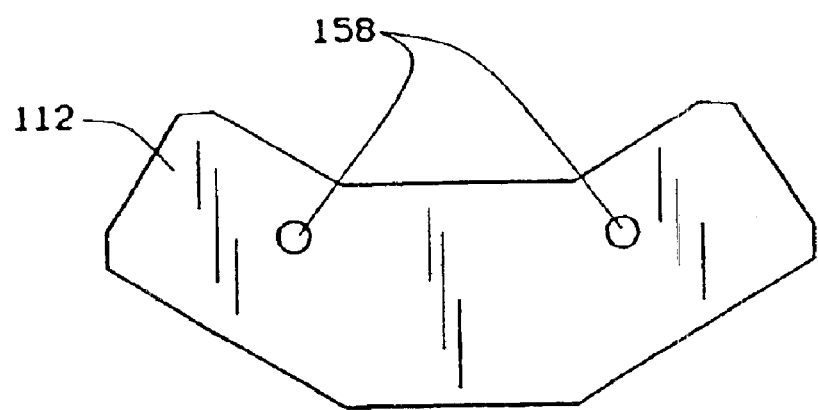
FIG. 4 is a schematic illustration of the thermal pad shown in FIG. 1.

FIG. 4 is a schematic illustration of thermal pad 112. In one embodiment, thermal pad 112 includes angled sides to permit increased contact with a portion of endshield 102 (not shown in FIG. 4). Thermal pad 112 has two openings 158 to help secure thermal pad 112 to the endshield.

Figure 5:
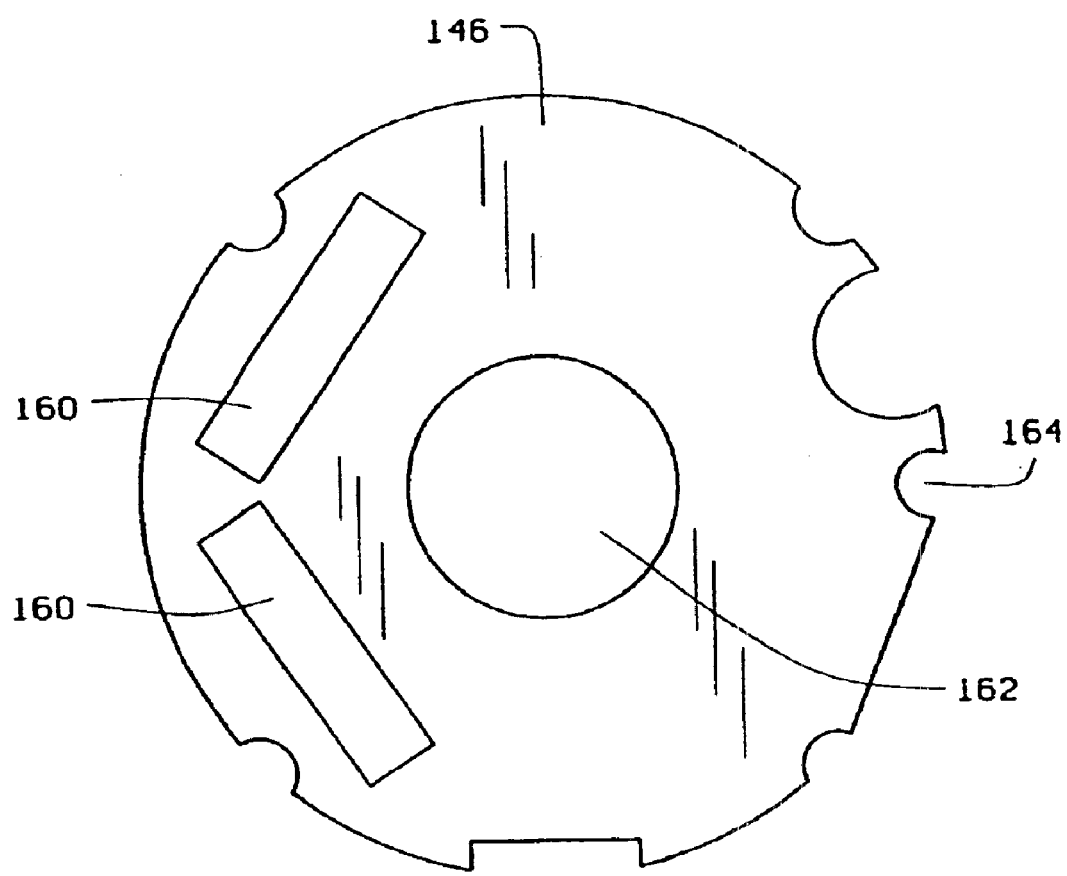
FIG. 5 is a schematic illustration of the insulator shown in FIG. 1.

FIG. 5 is a schematic illustration of insulator 146. Insulator 146 includes two openings 160 through which clamp bars 144 (not shown in FIG. 5) extend. Openings 160 are generally rectangular in shape and are positioned in close proximity to each other. Insulator 146 also includes a shaft opening 162 through which a shaft (not shown) of the electronically commutated motor extends. Insulator 146 is fabricated from mylar and provides both thermal and electrical insulation. Insulator 146 also includes a spacer opening 164 through which spacer 142 (not shown in FIG. 5) extends.

Endshield assembly 100 includes a thermal pathway that allows heat to be dissipated from the interior of endshield assembly 100, to the ambient environment. This thermal pathway enables control assembly 104 and power assembly 106 to be placed within the interior of the electronically commutated motor housing. This interior placement eliminates the need for a separate compartment to house the electronic controls of the motor, and facilitates reducing fabrication costs of the motor. In addition, the orientation of the transistor leads enables the leads to be encapsulated and protected from potentially harsh environmental conditions.

While the invention has been described in terms of various specific embodiments, those skilled in the art will recognize that the invention can be practiced with modification within the spirit and scope of the claims.

What is claimed is:

1. A motor endshield assembly comprising:
   an endshield comprising an outer surface, an inner surface having an inner portion, a shaft opening extending therebetween, and a plurality of recessed fins extending radially outward from said shaft opening towards an outer periphery of said endshield, such that each of said recessed fins extends from said inner portion to said outer surface;
   a control assembly in contact with said inner surface and positioned directly beneath said recessed fins; and
   a power assembly connected to said control assembly.

2. A motor endshield assembly in accordance with claim 1 wherein said inner portion further comprises a substantially flat raised portion for contacting said control assembly.

3. A motor endshield assembly in accordance with claim 2 wherein said recessed fins extend from said substantially flat raised portion.

4. A motor endshield assembly in accordance with claim 1 wherein said control assembly comprises a control board and a plurality of power transistors connected to said control board.

5. A motor endshield assembly in accordance with claim 4 wherein said control assembly further comprises a thermal pad between said power transistors and said endshield, said thermal pad for transferring heat from said transistors to said endshield and for electrically isolating said transistors.

6. A motor endshield assembly in accordance with claim 4 wherein each said power transistor comprises a plurality of leads, each said lead extending substantially parallel to said control board.

7. A motor endshield assembly in accordance with claim 6 wherein said transistors comprise a top surface, a bottom surface, a back, and a tab, said bottom surface contacting said control board, said tab extending from said back along said top surface.

8. A motor endshield assembly in accordance with claim 7 wherein said power transistor further includes a front, said leads extend from said front of said power transistors at a position closer to said bottom surface than to said top surface.

9. A motor endshield in accordance with claim 8 wherein said tabs comprise metal, said tabs contact a thermal pad which provides a thermal interface to said endshield.

10. A motor endshield assembly in accordance with claim 4 wherein said power assembly comprises a power board and an insulator positioned between said power board and said control board.

11. A motor endshield assembly in accordance with claim 10 further comprising:
a first spacer extending between said control board and said power assembly;
a plurality of clamp bars positioned between said power assembly and said power transistors, said first spacer and said claim bars extending through said insulator; and
a second spacer extending between said control board and said endshield.

12. A motor endshield assembly in accordance with claim 1 wherein said endshield is configured as a heatsink.

13. A motor endshield assembly in accordance with claim 1 further comprising a cap plug opening extending through said endshield and a cap plug covering said cap plug opening.

14. A motor endshield assembly in accordance with claim 1 wherein said endshield further comprises aluminum.

15. A motor endshield assembly in accordance with claim 1 wherein said endshield further comprises a plurality of bolt openings that extend through said endshield for receiving a through bolt.

16. A motor endshield for an electronically commutated motor, said endshield comprising:
a shaft opening configured to receive a motor shaft;
an internal surface comprising a substantially flat raised portion; and
an external surface comprising a raised cylindrical portion surrounding said opening and a plurality of recessed fins extending radially outward from said shaft opening towards an outer periphery of said endshield, such that each of said recessed fins extends from said substantially flat raised portion to said external surface.

17. A motor endshield in accordance with claim 16 further comprising a cap plug opening extending through said endshield.

18. A motor endshield in accordance with claim 16 further comprising a plurality of recessed openings extending through said endshield, each said recessed opening for receiving a through bolt.

19. A motor endshield in accordance with claim 16 wherein said endshield further comprises aluminum, said endshield configured as a heatsink.

20. A method of assembling a motor endshield assembly for an electronically commutated motor, the motor endshield assembly including a control assembly, a power assembly, and an endshield with an inner surface having an inner portion, an outer surface, a shaft opening extending therebetween, and a plurality of recessed fins extending radially outward from the shaft opening towards an outer periphery of the endshield, such that each of the recessed fins extends from the inner portion to the outer surface, said method comprising the steps of:
positioning the control assembly in contact with the inner surface of the endshield and directly beneath the recessed fins; and
connecting the power assembly to the control assembly.

21. A method in accordance with claim 20 wherein the control assembly includes a thermal pad and a control board with power transistors connected thereto, said step of positioning further comprising the steps of:
positioning the power transistors in thermal contact with the thermal pad; and
placing the thermal pad in contact with the endshield.

22. A method in accordance with claim 21 wherein the endshield inner surface includes a substantially flat raised portion, and the endshield outer surface includes a plurality of recessed fins, the recessed fins extending from the raised portion, said method of placing the thermal pad comprising the step of placing the thermal pad in contact with the substantially flat raised portion of the endshield such that the power transistors are in thermal contact with the recessed fins, wherein a thermal pathway is provided to dissipate heat from the transistors to the recessed fins and then to the ambient environment.

23. A method in accordance with claim 22 wherein the power assembly includes an insulator, a plurality of clamp bars, a spacer, and a power board, and wherein said step of connecting the power assembly to the control assembly comprises the step of placing the power assembly in contact with the control board.

24. A method in accordance with claim 23 wherein said method further includes the step of positioning the clamp bars to apply pressure to the transistors to enhance the thermal contact between the transistors and the recessed fins of the endshield.

* * * * *